(12) United States Patent
Spoleto

(10) Patent No.: US 7,582,252 B2
(45) Date of Patent: Sep. 1, 2009

(54) PLANT WITH ROTATING FURNACE FOR THE MELTING WITHOUT SALT OF ALUMINUM WITH SCREENING AND RECOVERY OF THE SLAGS

(75) Inventor: Antonio Spoleto, Naples (IT)

(73) Assignee: Hitech S.R.L., Nocera Inferiore (SA) (IT)

( * ) Notice: Subject to any disclaimer, the term of this patent is extended or adjusted under 35 U.S.C. 154(b) by 328 days.

(21) Appl. No.: 10/542,530

(22) PCT Filed: Dec. 30, 2003

(86) PCT No.: PCT/IT03/00862

§ 371 (c)(1),
(2), (4) Date: Jun. 26, 2006

(87) PCT Pub. No.: WO2004/063653

PCT Pub. Date: Jul. 29, 2004

(65) Prior Publication Data

US 2006/0273498 A1 Dec. 7, 2006

(30) Foreign Application Priority Data

Jan. 16, 2003 (IT) .......................... SA2003A0004

(51) Int. Cl.
*C22B 21/00* (2006.01)
(52) U.S. Cl. ...................... 266/142; 266/242; 266/275
(58) Field of Classification Search ................ 266/142, 266/242, 275
See application file for complete search history.

(56) References Cited

U.S. PATENT DOCUMENTS 1,798,500 A * 3/1931 Roser .......................... 202/218

(Continued)

FOREIGN PATENT DOCUMENTS

DE 200 13 042 U 1/2001

(Continued)

OTHER PUBLICATIONS

Unlu, N. et al., "Comparison of salt-free aluminum dross treatment processes," Resources Conservation and Recycling, Elsevier Science Publisher, Amsterdam, NL, vol. 36, No. 1, Jul. 2002, pp. 61-72.

*Primary Examiner*—Scott Kastler
(74) *Attorney, Agent, or Firm*—Mayer & Williams PC; Mark D. Wieczorek, Esq.

(57) ABSTRACT

A plant is provided for the melting of primary and secondary aluminium, provided with a rotating furnace, internally equipped with a spiral element (11), that causes the melting of the aluminium not requiring use of a salty bath. The plant includes a pouring channel (13) adjacent an exit hole (4) of the rotating furnace and material from the pouring channel enters the spherical store basin (16) positioned below if, the spherical store being equipped with a rotating joint (17) having a common inclination with the pouring channel (13) so that what is obtained is the direct and continuous flow of the fused metal in the spherical store without interruption of the process of melting. The plant is also equipped with an automatic and continuous system of selection and recovery of the slag of fusion, integrated in the same plant, and a double system of canalization of the gases that allows cleaning of the pollutant agents and energy conservation in the melting furnace.

15 Claims, 6 Drawing Sheets

U.S. PATENT DOCUMENTS

| | | | |
|---|---|---|---|
| 2,165,128 A * | 7/1939 | Cheesman | 432/48 |
| 2,223,569 A * | 12/1940 | Lohse | 266/155 |
| 3,228,670 A * | 1/1966 | Moklebust | 266/173 |
| 4,010,935 A | 3/1977 | Stephens | 266/44 |
| 4,491,473 A | 1/1985 | Bowman et al. | 75/63 |

FOREIGN PATENT DOCUMENTS

| | | |
|---|---|---|
| EP | 0 400 925 A | 5/1990 |
| JP | 10 244241 A | 9/1998 |
| WO | WO 02/39044 | 5/2002 |
| WO | WO 02/101309 | 12/2002 |

* cited by examiner

PLANT WITH ROTATING FURNACE FOR THE MELTING WITHOUT SALT OF ALUMINUM WITH SCREENING AND RECOVERY OF THE SLAGS

TECHNICAL FIELD

An object of the present invention is a modular plant for the melting of metallic materials, especially aluminium scraps, comprising a rotating furnace characterized by the lack of use of a salty bath, and with direct pouring of the melted metal in a spherical storage tank, an equipment for the selection and recovery of the slag of fusion, and a system of scavenging.

STATE OF THE ART

As is known, melting of aluminium scraps, for the production of ingots for alloys, and also remelting of the same aluminium ingots, is realized in rotating furnaces, also called salty bath furnaces, in which sea salt (usually mixed with carbonate of soda, salnitro and yellow prussiato of potassium) is melted by the heat produced in the furnace.

Salt is a good receiver and transmitter of heat and its addition is useful as a cover agent to prevent the oxidation of the metal in the fusion. At almost 1000° C. it reacts, englobing the slag of fusion of the aluminium scraps. The principal drawback of these furnaces is the production of a notable quantity of refuse, essentially constituted by the salty products mixed to the slag of the process of fusion of the aluminium scrap. Problems exist because of the disposal of this fuse. Recycling the refuse is not always possible or convenient from an economic point of view, and impacts the final price of the ingot of aluminium.

SCOPE OF THE INVENTION

The present invention avoids the drawbacks of the preceding systems primarily by use of a rotating furnace for the fusion of primary and secondary aluminium that does not have to realize the fusion of the aluminium using a salty bath. Another is the realization of a rotating furnace for the fusion of the primary and secondary aluminium, according with the preceding purposes, in which it is the direct and continuous pouring of the fused metal in a spherical store tank without any interruption of the process of fusion, so that to improve the use of fuel, of workforce, of salty materials, and the safety conditions of the job.

Another is to obtain a plant of fusion of the aluminium that directly has an automatic and continuous system of selection and recovery of the slag of fusion integrated in the same plant, without requiring treatments in different places, so as to realize advantages in terms of costs related to the disposal of the slag and its recycling.

Another is to obtain a plant of fusion of the aluminium for the production of ingots for foundry, according with the preceding purposes, which is completely modular, such that the various units, placeable on a track, are separable to make easy both the construction and the assemblage of them, as well as the maintenance and the substitution.

Another is to obtain a plant of fusion of the aluminium for the production of ingots for a foundry, according with the preceding purposes, having a system of scavenging that allows a smaller waste of thermal energy in the furnace of fusion and simultaneously a cleaning of the gases from heavy pollutants before the stack such that the quality of the air breathed by the employees in the plant, as well as others, is decidedly improved in comparison to preceding plants.

BRIEF DESCRIPTION OF THE DRAWINGS

Further characteristics and advantages of the invention will result more clearly from the following description and from the attached drawings, furnished only to indicate examples and not as limitations.

The FIG. 1 shows, in a three-dimensional way, the general view of the system of fusion according to the present invention.

Figure 1:
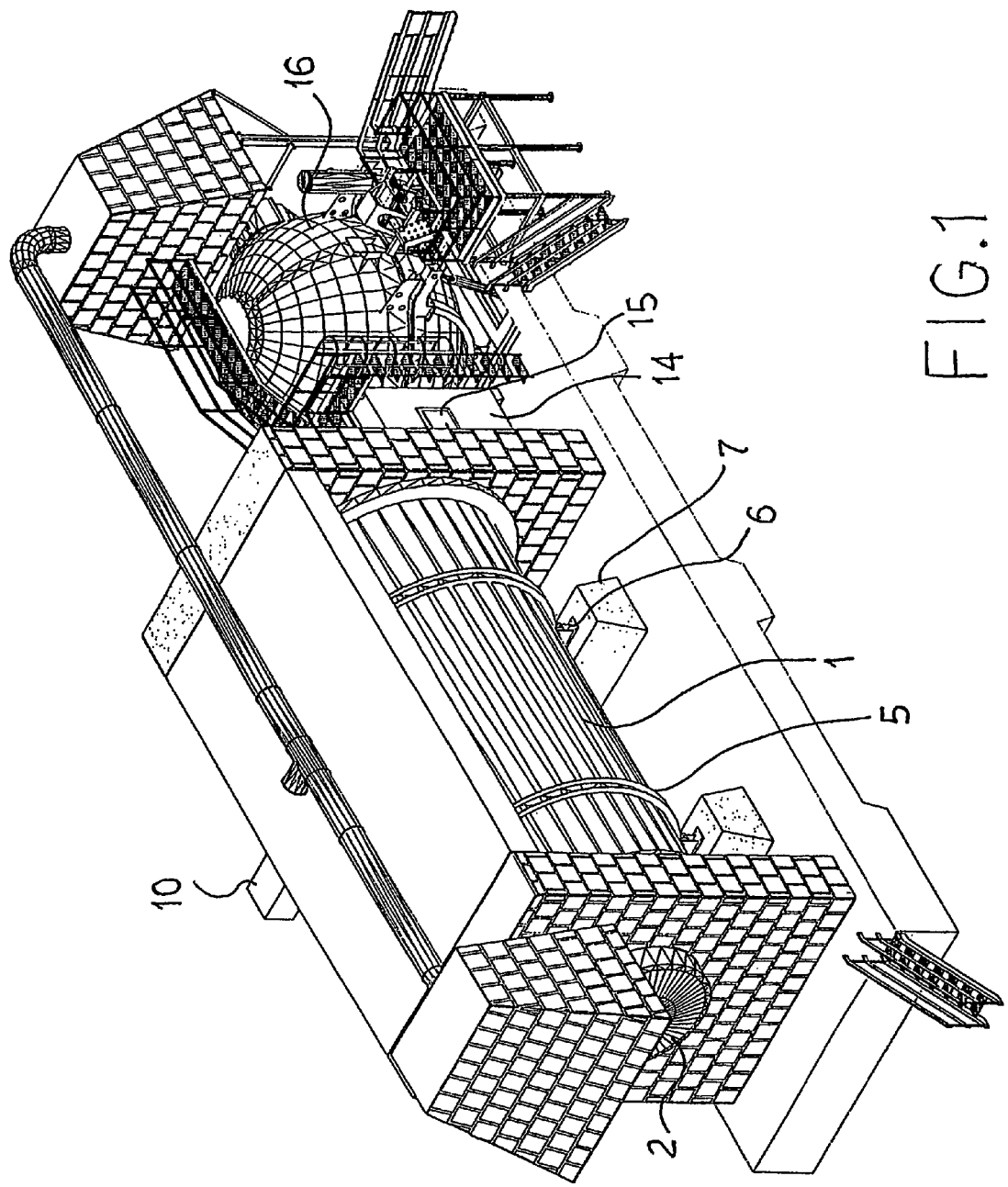
Figure 2:
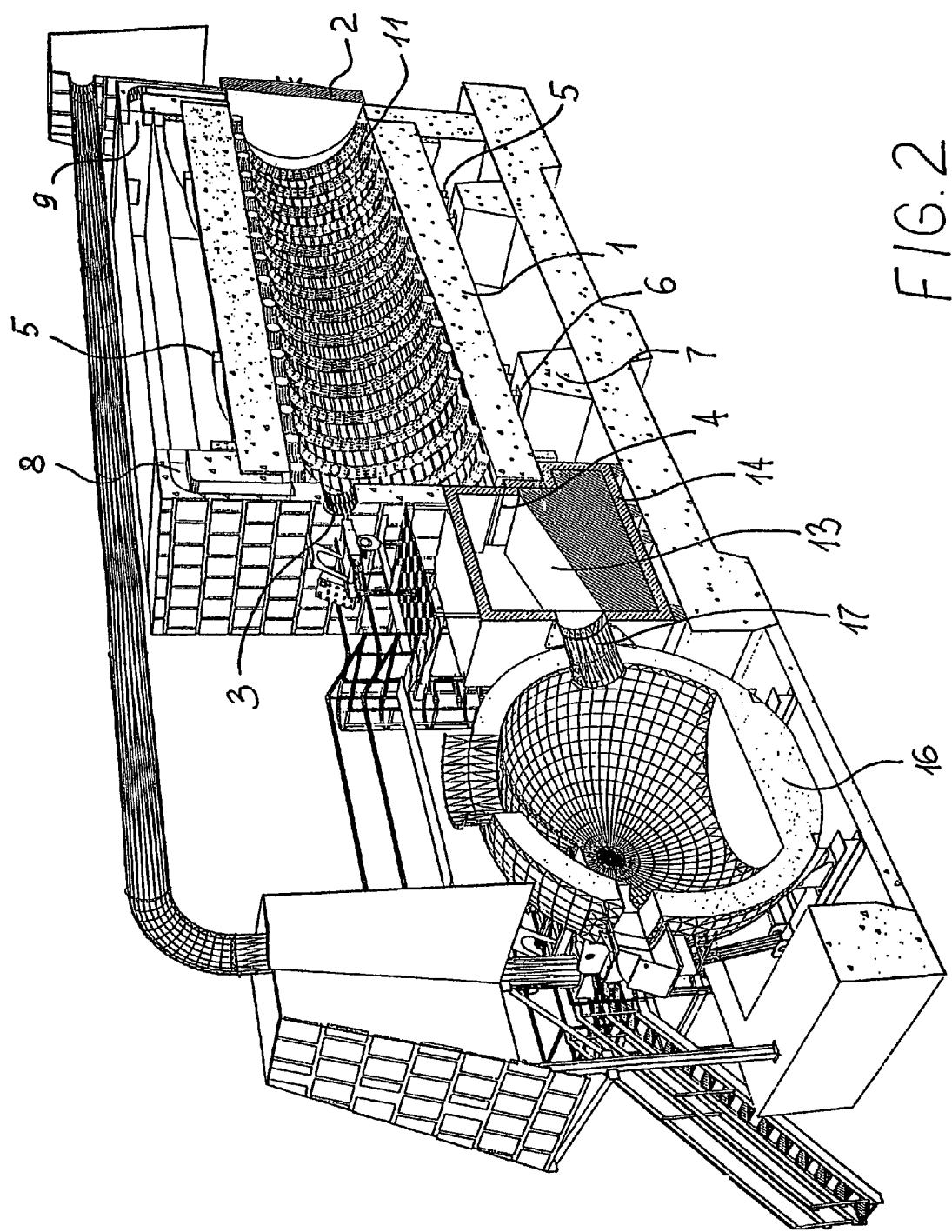

The FIG. 2 shows, in a perspective section, the general view of the system of fusion according to the present invention.

Figure 3:
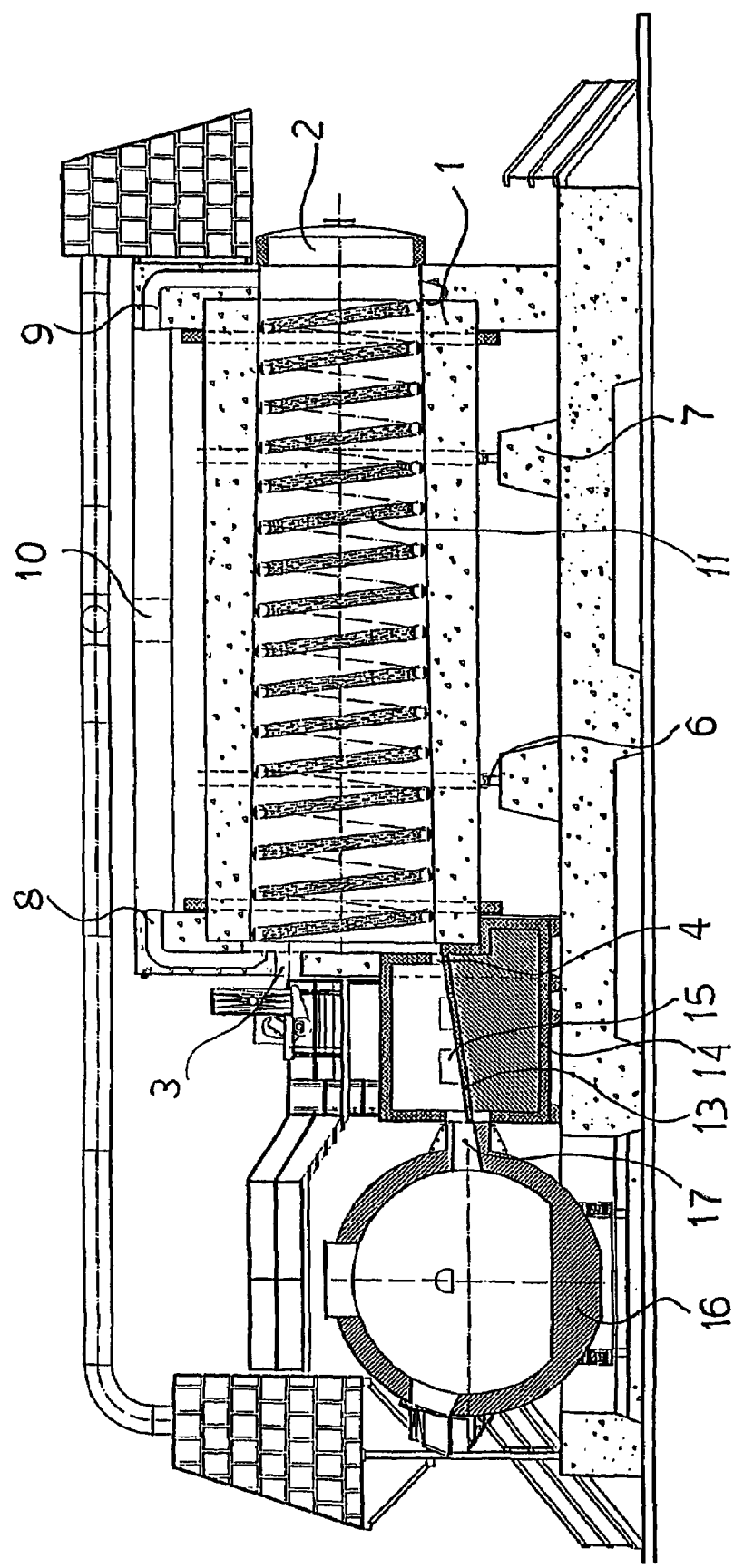

The FIG. 3 shows a longitudinal section of the general view of the system of fusion according to the present invention.

Figure 4:
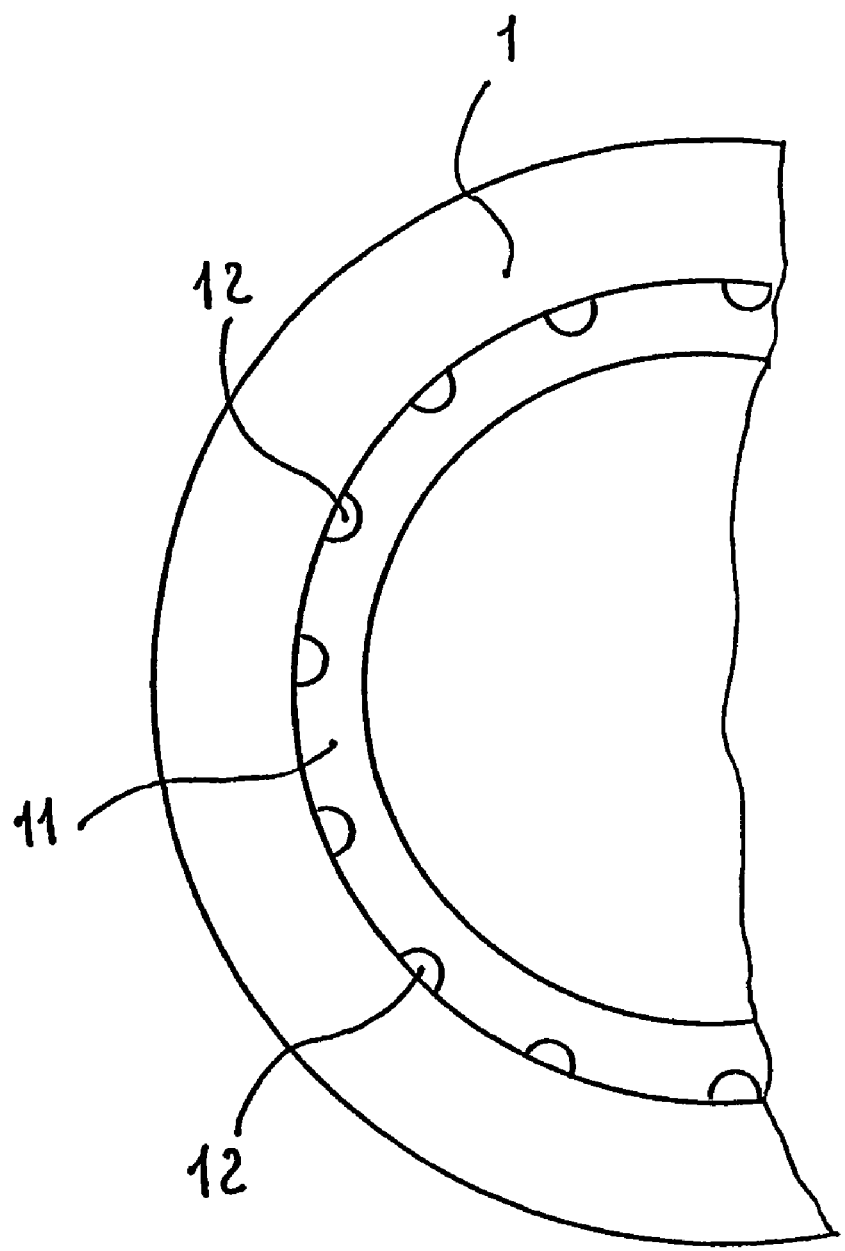

The FIG. 4 shows, schematically and in a lateral point of view, a portion of the spiral element with the channels realized on it.

Figure 5:
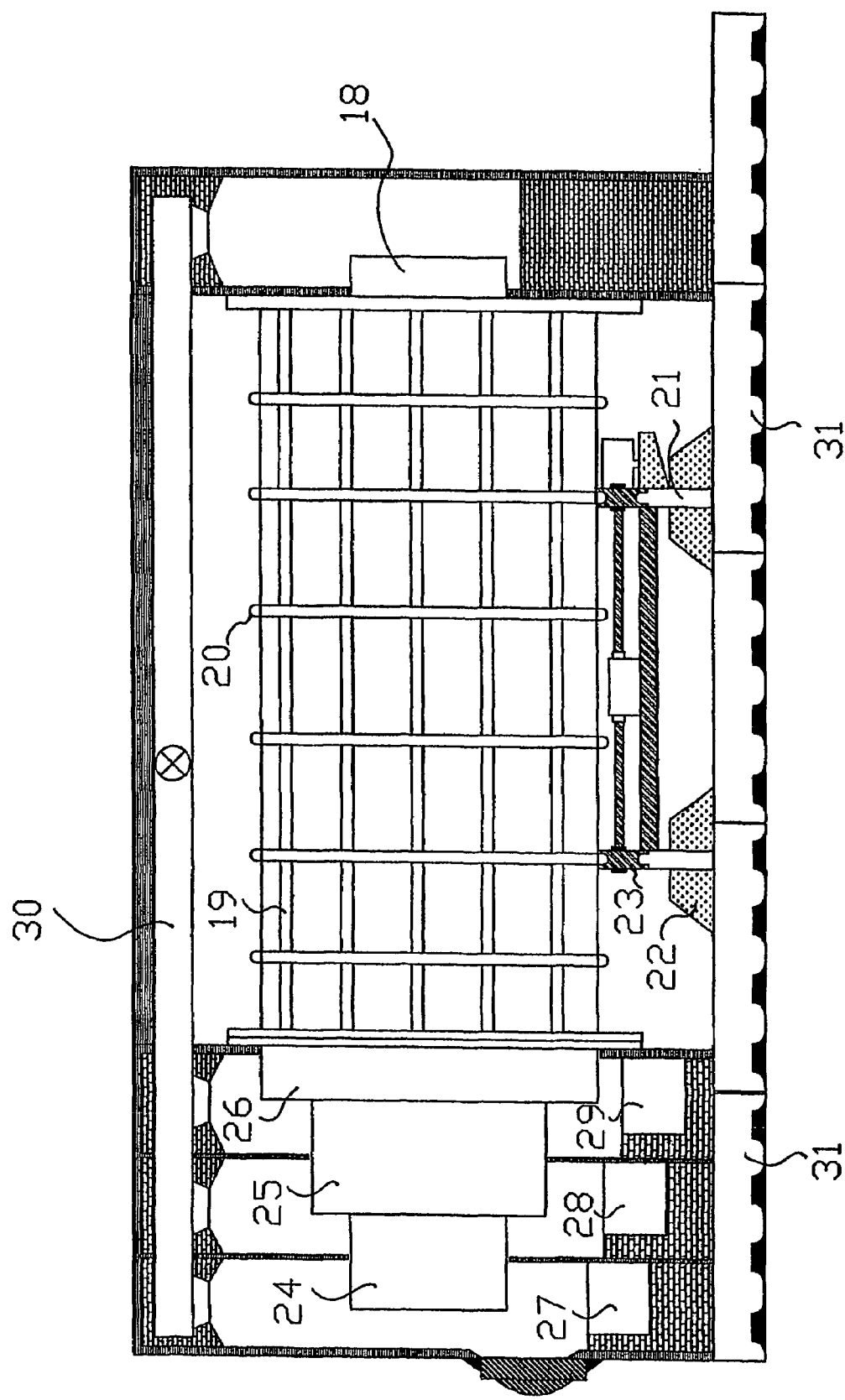

The FIG. 5 shows, in a lateral longitudinal view, the equipment for treating of the slag with a disposition for the scavenging as well as tracks for moving.

Figure 6:
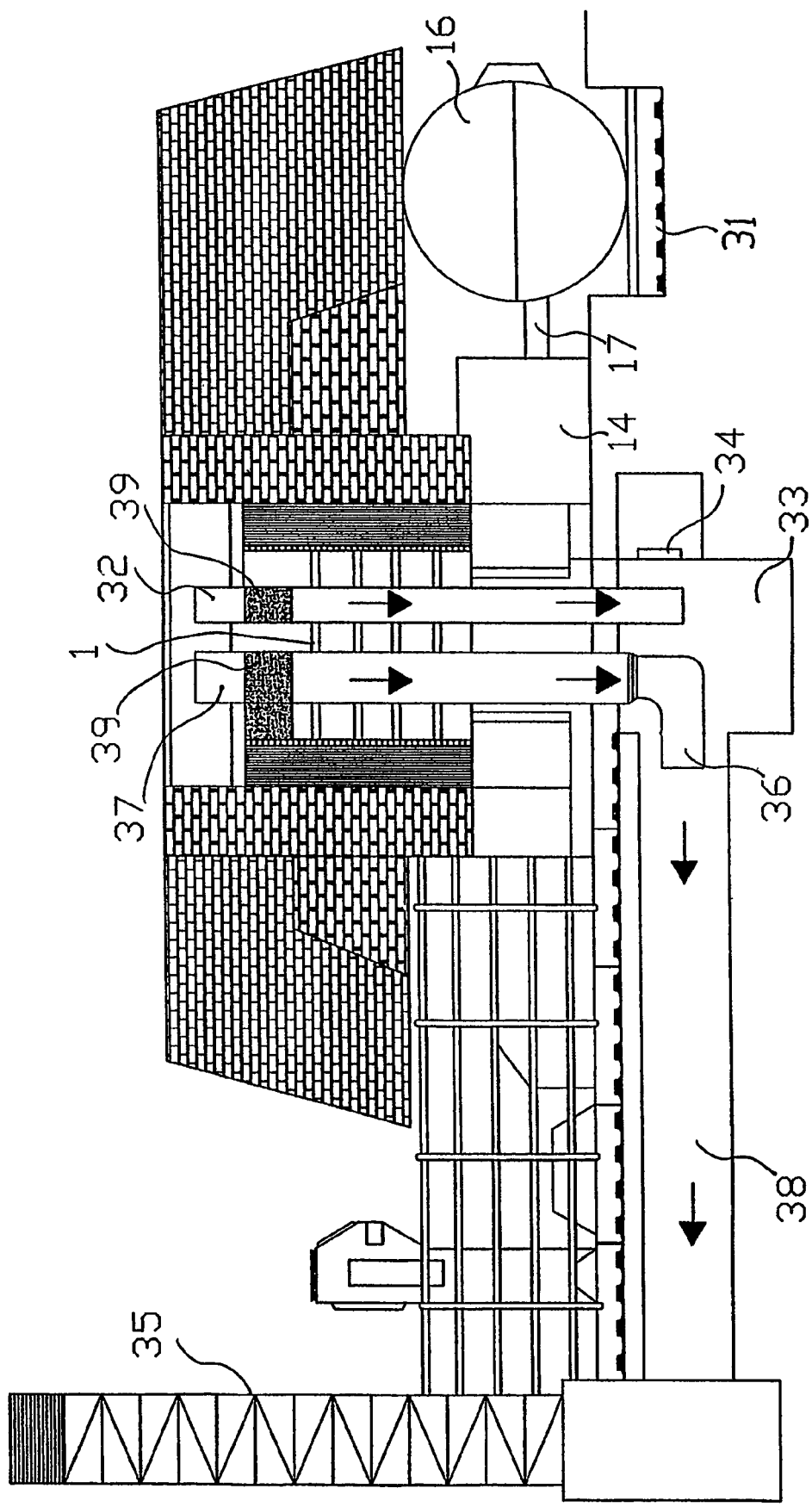

The FIG. 6 shows, schematically and in a general view, components of the plant, mainly the store tank of the fused metal and the system of scavenging.

DETAILED DESCRIPTION

According to the drawings, the furnace that realizes the fusion of the primary and secondary aluminium scraps, is constituted by a cylindrical hollow body (1), with circular section, built in a refractory material, resistant to thermal stress. On an extremity, the body (1) is closed by a porthole (2) used for the loading of the metallic scraps. On the other extremity, a window of entry (3) is provided for the flame of heat of the scrap. Downward a hole (4) is provided for the leakage of the fused liquid that, as illustrated by the drawings, is realized in a plain slot.

The inside diameter of the body (1) changes constantly along its longitudinal axis to originate a negative inclination on the horizontal line beginning from the extremity at the loading porthole (2) up to the extremity where is positioned the hole (4) for leakage of the melted metal. The difference of inclination among the two extremities, in comparison to the horizontal line, is 2 centimeters per linear meter of the length of the furnace.

The furnace is covered by a metallic structure and is kept in a horizontal position by metallic traverse frames (5) that place and creep on the slides (6) held on the metallic supports (7). On both the left and right extremities of the body (1) are openings (8) and (9) for scavenging the fumes that join in a single channel of evacuation (10). On the surface of the inside wall of the body (1) and along all its length, a spiral element (11) is provided, whose spires, in a first preferred and illustrated shape, are cylindrical, with circular section, with constant diameter and made of a refractory material resistant to the heat and to the mechanical stress due to the action of the scrap in fusion. On the spires of the spiral element (11) and in the bottom side, close to the wall of the cylinder body (1), are a multiplicity of galleries or channels (12) with a preferred semicircular section.

A channel for pouring (13), realized with a suitable inclination and adequately contained in an box (14) insulated and equipped with a window (15), is placed among the hole (4) and the spherical storage basin (16) positioned on a lower plan in a pit. The basin (16) has adequately been described in the patent WO 02/39044 by the same applicant. The rotating joint (17), in comparison to that described in the aforesaid patent, has a different shape, so as to realize a continuity of inclination with the channel of pouring (13).

The principal characteristics of a preferred example of realization of the rotating furnace, for the fusion of the primary and secondary aluminium, are the following parameters:

external diameter: 500 centimeters
inside diameter: 320 centimeters
thickness of the refractory cement: 90 centimeters
length of the cylinder: 1200 centimeters
inclination for the pouring: 24 centimeters
working temperature: 750-800.degree. C.
feeding: methane, oil
heat consumption: 750 Kcal/h for Kg/liquid aluminium produced The furnace is maintained in a slow rotation, from one to four revolution/minute, on its mean axle by a gear motor.

DESCRIPTION OF THE PROCESS OF FUSION

If the melting of secondary aluminium is preferred, at first is realized the selection and mixing of different types of aluminium scraps, whose chemical composition has to be as close as possible to that of the desired alloy. Then the aluminium scraps are set, through the loading porthole (2), in the rotating furnace without adding of sodium chloride as a cover agent to prevent the oxidation of the metal.

Because of the rotation of the furnace and the special inside conformation, it is obtained the mechanical remixing of the scrap in fusion with, simultaneously, an action of carriage of the material by the walls of the furnace. The metal gradually melts and the liquid aluminium begins to rotate in the same sense of rotation of the furnace. It will always be positioned in the lower part of the furnace, because the force of gravity exceeds the carry force due to the rotation. Moreover, because of the rotational movement, joined to the inside inclination of the furnace, the liquid metal continually slides to the drawing hole (4) that is put in the lowest point, flowing through the small channels (12) transversally set to the spires of the body (11).

The liquid metal is protected against the oxidation of the air because of its low position, it is not directly licked up by the stream of the warm gases (whose flow is horizontal and situated in the tall part of the furnace), as well as because it continually flows in the basin (16) where the fused metal is stored, through the pouring channel (13). The slags remain in the tall part and are held by the spiral body (11) and, once all the aluminium is melted and has been stored in the spherical basin, are discharged close to the loading porthole through a channel equipped with a screw conveyor, finishing the process of melting.

The slags, put in the channel and pushed by the screw conveyor, reaches the module of selection wherein they enter from the extremity (18). The module of selection is constituted by three hollow metallic and coaxial cylinders, one inserted in the other, and open to the left end, and is kept in a horizontal position by booms (19) and metallic traverse frames (20) that place and creep on the slides (21) joined on metallic supports (22) with the interposition of a gear carriage (23).

The cylinders (24) and (25) have a surface side equipped with holes, greater on the first cylinder (24) and smaller on the second (25) so that it is possible the pouring of slags of different dimensions. The whole, constituted by the three cylinders, is put in slow rotation around the longitudinal axle, so a remixing of the slags occur as soon as they advance along the cylinders pushed by the screw conveyor. The slag, according to their weight and dimension, pass from the first cylinder (24) to the last one (26). Actually, in the first cylinder (24), with smaller diameter, are the slags essentially constituted by iron parts, steel, copper, that is, material that has not been put through the process of fusion or only been put through a small amount; in the second cylinder (25) are the slags of aluminium oxide, while in the third cylinder (26) are essentially the dusts. It is very interesting to note that the slags, flowing, are selected as well as they are cooled. The slags, so treated, flow out of the extremities of the cylinders and fall in the channels (27), (28), (29) positioned every one below a cylinder and, by a screw conveyor system present in every channel, are pushed, at almost ambient temperature, in the storage buckets.

The recovered aluminium oxide is recycled and joined to the feeding charge of fusion. All of the exhaust gases produced in the module of selection and recovery of the slag are carried, through canalizations, to the cap (30), and do not escape in the external environment.

It is very important that the module of selection and recovery of the slag is constituted by units, placeables on tracks, (31), so that they can be open for inspections and maintenance.

Even if it is not represented in the drawings, the furnace of fusion is also modular, put on carriages that are moved on tracks, to make possible the opening.

Another great innovation is the system of scavenging, constituted by two separate canalizations. The warm gases, originated by the furnace of fusion at a maximum temperature of 300° C., are carried through the pipeline (32) in the underground pit (33) accessible by a porthole of inspection (34). The gases exclusively escape from the furnace of fusion, because of the concomitant action due to the kinetic energy (that originates from their heat), to the expansion that they have by reaching the pit (33), to the loss of pressure produced by the chimney (35) and to the drag force produced by the air flow, at a great speed, that escapes from the extremity (36) of the pipeline (37). In the pit (33) the warm gases, because of the expansion, decrease in temperature and also realize a first falling of the heaviest particles of pollutant agents in the gases.

All the other gases that escape from the modules, having a lower temperature, are carried to the pipeline (37) by extractors, continuing in an underground pipeline (38) up to the chimney (35) equipped with various devices for cleaning of the dangerous gases for the environment according to the laws in force.

Both pipelines (32) and (37) are equipped with a control valve (39) for automatic passage of the gases. The present system, besides the aforesaid advantages, realizes also an energetic conservation in the furnace of fusion, because the gases are evacuated in a natural way and only in the quantity necessary to the process of combustion, not having additional quantities of heat for an excess of evacuation of the gases.

As previously described and illustrated, it is clear that the invention reaches the scope. Dimensions and shapes can be adjusted according to the demands.

The invention claimed is:
1. A plant for the melting of primary and secondary aluminum, with screening and recovery of slags, comprising:
   a. a rotating furnace, an interior wall of the rotating furnace including a spiral element, the rotating furnace further including an exit hole;
   b. a pouring channel having a first inclination, the pouring channel within an insulated box, the insulated box having a window formed therein, wherein the pouring chan- nel is disposed adjacent the exit hole and configured such that the pouring channel receives material exiting from the exit hole;

c. a spherical storage basin, the spherical storage basin having a rotating joint configured to receive material from the pouring channel, the rotating joint further having a surface having an inclination substantially the same as the first inclination;

d. selection means for recovering selected materials; and e. a double canalization means for removing exhaust gases that are produced during the fusion or melting, f. such that the fusion of aluminum occurs in the absence of a salt bath.

2. The plant of claim 1, wherein the rotating furnace includes:

a. a hollow cylindrical body having a circular cross section, the hollow cylindrical body having a porthole at a first end for introduction of material and further having an inside diameter that varies along a longitudinal axis such that an internal surface of the hollow cylindrical body slants with a negative inclination towards a second end, the second end adjacent the exit hole.

3. The plant of claim 2, wherein the negative inclination is substantially two centimeters per linear meter of a length of the rotating furnace.

4. The plant of claim 2, further comprising:

a. a first plurality of metallic traverse frames; and b. a second plurality of slides disposed above a third plurality of metallic supports, c. wherein the rotating furnace is kept in a position by the first plurality, and further comprising at least one opening in the hollow cylindrical body to allow the escape of exhaust gases into a channel of evacuation.

5. The plant of claim 1, wherein the spiral element includes a spire with a cylindrical cross-section and a constant radius, the spiral element made of a refractory material, and wherein the spiral element further comprises, in a lower portion of the hollow cylindrical body, a multiplicity of channels, each channel having a semicircular shape.

6. The plant of claim 1, wherein the spiral element includes a spire with a cross-section that is elliptical or polygonal.

7. The plant of claim 1, wherein the spiral element includes a spire with a cylindrical cross-section and a constant radius, the spiral element made of a refractory material, and wherein the spiral element further comprises, in a lower portion of the hollow cylindrical body, a multiplicity of channels, each channel having a shape that is either circular, elliptical, or polygonal.

8. The plant of claim 1, wherein the selection means includes a rotating selection module, comprising:

a. three metallic hollow and coaxial cylinders, each open at one end, comprising a first cylinder, a second cylinder disposed within the first cylinder, and a third cylinder disposed within the second cylinder, the second and third cylinders defining holes thereon, the holes having a larger diameter on the third cylinder than on the second cylinder.

9. The plant of claim 1, further comprising first, second, and third channels disposed and configured to receive material that exits from the first, second, and third cylinders, respectively.

10. The plant of claim 1, wherein the selection means is disposed on at least one track, such that the selection means may be conveniently maintained.

11. A method of using the plant of claim 1 to obtain a desired alloy, comprising:

a. if melting secondary aluminum, selecting mixing of a plurality of types of aluminum scraps, a chemical composition of the plurality having a proximity to that of the desired alloy;

b. placing the aluminum scraps through the porthole, and melting the aluminum scraps in the rotating furnace without adding sodium chloride as a cover agent; and c. rotating the furnace and obtaining mechanical remixing of the aluminum scraps in fusion, and dragging the aluminum scraps because of the structure of the internal walls of the rotating furnace, d. such that the rotational movement, in combination with the inclination of the furnace, provides that the liquid metal flows toward the exit hole;

e. and such that the liquid metal is protected against oxidation because the liquid metal is lower than a stream of warm gases and because it flows to the storage basin via the channel of pouring;

f. and such that the slag is discharged into a channel equipped with a screw conveyor, the screw conveyor pushing the slag to an extremity of the selection means;

g. and such that the slag is sorted according to dimension and weight, in inert and ferrous material, in aluminum oxides and dusts, and is introduced, automatically, in the respective channels, equipped with a screw conveyor, and flows into a plurality of storage containers;

h. and such that the recovered aluminum oxide is recycled to integrate a feeding charge of fusion.

12. The method of claim 11, further comprising carrying the warm gases that originate from the melting furnace, at a maximum temperature of 300° C., through a pipeline in an underground pit.

13. The method of claim 12, wherein the gases escape from the melting furnace due to a concomitant effect of the kinetic energy due to their heat, of the expansion of the gases upon reaching the pit, of a loss of pressure produced by a chimney and of a dragging produced by an air flow, having a high speed, that escapes from an extremity of a pipeline.

14. The method of claim 13, further comprising carrying by extractors the exhaust gases that escape from the selection means, from the recovery of the slag and from the store basin, and having a low temperature, to the pipeline and further to an underground pipeline to the chimney.

15. The method of claim 14, further comprising passing the gas through the pipeline using at least in part a control valve.

* * * * *